United States Patent
Miceli (10) Patent No.: US 8,045,006 B2
(45) Date of Patent: Oct. 25, 2011

(54) METHOD AND APPARATUS FOR DETERMINING THE BEST BLENDING OF OVERLAPPED PORTIONS OF PROJECTED IMAGES

(75) Inventor: Sean Miceli, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 336 days.

(21) Appl. No.: 12/501,162

(22) Filed: Jul. 10, 2009

(65) Prior Publication Data

US 2011/0007172 A1    Jan. 13, 2011

(51) Int. Cl.
*H04N 17/00* (2006.01)
*H04N 9/30* (2006.01)
*G03B 21/14* (2006.01)
*G02F 1/1335* (2006.01)

(52) U.S. Cl. .............. 348/189; 348/383; 349/7; 353/48; 353/94

(58) Field of Classification Search .................. 345/903; 348/189, 383, 747; 349/5, 7; 352/69, 70, 352/71, 133; 353/30, 48, 94
See application file for complete search history.

(56) References Cited

U.S. PATENT DOCUMENTS

| | | | |
|---|---|---|---|
| 4,974,073 A | 11/1990 | Inova | |
| 5,668,569 A | 9/1997 | Greene et al. | |
| 6,377,306 B1 | 4/2002 | Johnson et al. | |
| 6,570,623 B1 | 5/2003 | Li et al. | |
| 2002/0041364 A1* | 4/2002 | Ioka | 353/69 |
| 2002/0057361 A1* | 5/2002 | Mayer, III et al. | 348/383 |
| 2004/0227908 A1* | 11/2004 | Wada et al. | 353/94 |
| 2005/0206856 A1* | 9/2005 | Ishii | 353/94 |
| 2007/0188719 A1* | 8/2007 | Jaynes et al. | 353/94 |
| 2007/0291184 A1* | 12/2007 | Harville et al. | 348/383 |
| 2007/0291189 A1 | 12/2007 | Harville | |
| 2008/0143978 A1* | 6/2008 | Damera-Venkata et al. | 353/94 |
| 2008/0266321 A1 | 10/2008 | Aufranc et al. | |

OTHER PUBLICATIONS

Rasker, R., et al., "A Low-Cost Projector Mosaic with Fast Registration", Mitsubishi Electric Research Laboratories, Proceedings of the 5th Asian Conference on Computer Vision, Jan. 23-25, 2002.

* cited by examiner

*Primary Examiner* — Jason Whipkey
(74) *Attorney, Agent, or Firm* — Mark P. Watson (57) ABSTRACT

A best blending function from among a plurality of blending functions is determined. Each of the plurality of blending functions smoothes an overlap region of at least two projected images. The overlap image is captured and a processing unit analyzes the stored overlap image for color value linearity to calculate a first smoothness result. The processing unit analyzes the projection of the first or second image for color value uniformity to calculate a second smoothness result. These smoothness results for one blending function are paired and compared to smoothness result pairs corresponding to other blending functions to determine a best blending function from among those being analyzed.

20 Claims, 5 Drawing Sheets

METHOD AND APPARATUS FOR DETERMINING THE BEST BLENDING OF OVERLAPPED PORTIONS OF PROJECTED IMAGES

BACKGROUND

The present invention is related to a multiple projector system. In this system multiple projectors are controlled and coordinated to provide a large display region such as a wall display. In such a display the goal is to provide a seamless image. However, in certain areas there is an overlap region where two projectors contribute light output to the same portion of the display surface. Unfortunately the combination from two projectors in this overlap region is additive and results in a brighter region with color differences. The overlap region is thus a visible band in the overall displayed image.

In order to minimize the visual band that occurs from the overlap region, a number of techniques have been proposed to "blend" the image to reduce the visual differences from one region to another. A simple blending method would output pixels in the overlapping edge regions of projector A and B at only 50% of their source brightness. Or, similarly, another simple method would have the pixels in the overlapping edge region of projector A be set to black (0% brightness) and pixels from overlapping edge region of projector B be left unchanged. Either method might conclude that the additive output will equate with 100% source brightness on the display surface.

However, this assumption incorrectly simplifies conditions that exist with actual projectors. With such an approach, boundaries between non-overlapped and overlapped regions (at the left or right edges) require perfect alignment or results are visible as bright seams or gaps. Also, the extra light output by a single projector, even if emitting black, can affect the color blending enough to notice the edge boundaries. Device light output levels are seldom identical and so the 50%/50% approach cannot ensure success. Better blending is required to smoothly transition among non-overlapping and overlapping regions.

One better technique is to gradually reduce the output brightness for each projector pixel in the overlapping region in a reciprocal fashion. The brightness level of one projector gradual diminishes while the brightness of the other increases across the overlapping region. Each individual projector therefore contributes maximum brightness at its inside edge, equivalent to the non-overlapping regions nearest said edge, and contributes minimum brightness at its outside edge, furthest overlapped into the opposite projector at the boundary to the opposite projector's non-overlapped region. For example, pixels at the inside edges of the overlapping region are output at 100% brightness, while pixels at the outside edges are output at 0% brightness. This ensures that at any point between the left and right edges, exactly 100% brightness will be achieved through a combination of the brightness of projector A plus the brightness of projector B. Since each logical pixel in the overlap region has some brightness value from either projector A or B, and no logical pixel contributes more than 100% brightness, there should be no seams or gaps.

Again, in actual practice, this better but still simple technique results in some visual bands or gaps in the image. Thus, in practice, the projectors are further adjusted using different blending formulas until the overall image looks fairly uniform. The terms "function," "formula," and "algorithm" are used interchangeably herein to describe any method that blends or smoothes the overlap region formed between two projected images. As will be appreciated, there are an infinite number of blending formulas that can be used. But, there is no method available to determine the best formula for a particular situation, i.e., a particular set of projectors.

DESCRIPTION OF RELATED ART

The prior art is primarily directed to particular blending algorithms. For example, "A low-cost projector mosaic with fast registration" (Raskar et al., 2002) describes an intensity blending algorithm with linear ramps that is intended to ensure that the weight of the pixels illuminating the same display surface adds up to unity. Similarly, Inova (U.S. Pat. No. 4,974,073) discloses ramping functions that are used to ensure uniform brightness in the image, including overlap regions.

However, none of the prior art seems to disclose a method for determining a "best" ramping function from among a plurality of potential ramping functions.

SUMMARY OF INVENTION

The present invention addresses this problem by providing a method for comparing blending functions/formulas/algorithms and arriving at a "best blend" solution. In the present invention, two projectors are used to display a composite image with an overlap region as described above. A camera captures the image and feeds it to a processing unit such as a personal computer. The processing unit stores a number of blending functions that can be used to control/manipulate the individual pixels of each projector to alter (improve) the overlap region of the composite image.

The present invention stores the camera image for a plurality of blends. These captured images are stored in Virtual Pixel Map (VPM) files that form an accurate pixel registration map of each projector. Using the VPM files, each physical device pixel on a projector can be mapped to one or more logical pixels in a virtual region defining the large format display (composite image). This virtual large format display resolution defines the unit of each VPM pixel, which is a virtual pixel in the logical display region. It also defines the relative location of VPM pixels on one device relative to VPM pixels on another. The bounded display region represents a homogenous portion of the logical display region within which every pixel is addressable by at least one physical device pixel.

Thus, for each blending function, the result (captured image) is stored in a memory. Each captured image will be composed of pixels, each pixel having a color value and a location.

For each of the blending functions, the pixels in the overlap region are examined for two qualities that can be measured independently: color value uniformity and closeness to a linear blend from one side of the overlap region to the other. One of these values, closeness to a linear blend, is measured from the perspective of the camera, i.e. the captured image. The other value, color value uniformity, is measured from the perspective of a projector, i.e. the device output pixel values. These two qualities form a paired smoothness result for each blending function and the paired smoothness results are compared to one another to see which blending function yields the best result. By examining closely related qualities from two independent perspectives we arrive at the best available blending function/formula/algorithm.

Each smoothness qualities pair can be plotted as a point in an X-Y Cartesian coordinate system with the point closest to the origin (i.e. shortest vector length) representing the best blending function.

One or more of the methods of the present invention may be embodied on a computer readable medium comprising one or more sequences of instructions which, when executed by one or more processing units, causes the one or more processing units to perform the one or more methods.

BRIEF DESCRIPTION OF THE DRAWINGS

In the drawings wherein like reference symbols refer to like parts.

DESCRIPTION OF THE PREFERRED EMBODIMENTS

Figure 1:
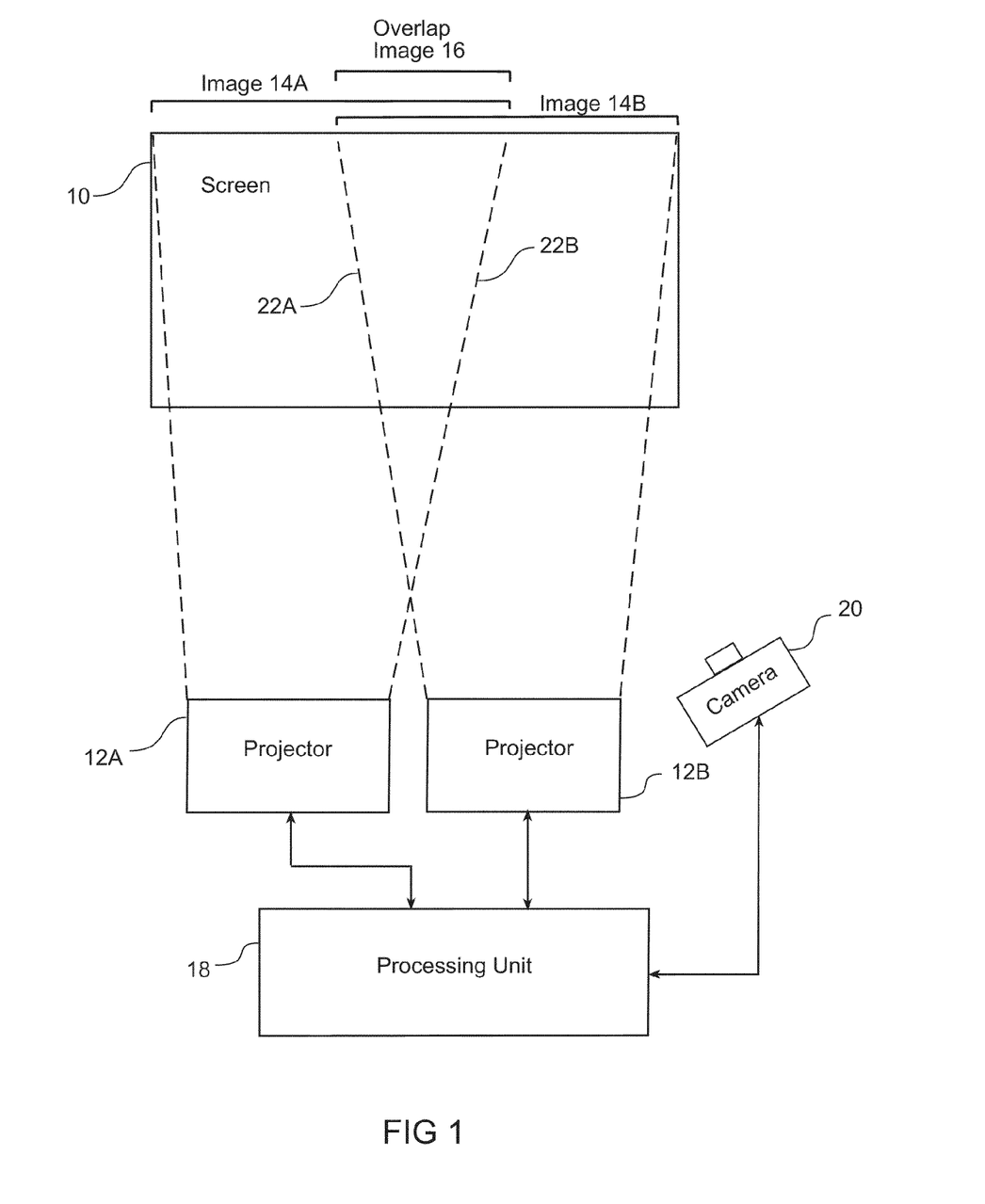
FIG. 1 is a general block diagram of the system of the present invention.

FIG. 1 shows a general system block diagram of the environment of the present invention. In this system, multiple projectors are controlled and coordinated to provide a large display region such as a wall display. In FIG. 1, just two projectors are illustrated for simplicity; however, in a large system three, four, or more projectors may be utilized. As shown, projectors 12A and 12B each project an image onto a portion of the screen 10, with image 14A occupying one portion, image 14B occupying a second portion, and overlap image 16 occupying a portion that represents the intersection of images 14A and 14B projected onto screen 10. Using multiple projectors in this manner with overlapping and complementary projections can be used to provide a very large, but still very bright and clear, continuous display.

Various approaches are available to build the multi-projector display of FIG. 1. It is well known that in order to project what appears to be a single continuous image, a camera (or cameras) is used to determine the display surface and each individual projector's intrinsic and extrinsic parameters all in a common coordinate frame. This enables multiple projectors to generate a rectangular image of known aspect ratio even though the projectors themselves are aimed at an arbitrarily inclined planar surface. One approach is to use a camera 20 that has been calibrated by viewing a regularly spaced grid placed on the screen 10, and then registering subsequent images from projectors 12A and 12B to the grid. Another approach is, for each projector, project a structured pattern (e.g. checkerboard), extract features from the pattern and find the camera-projector pixel correspondence, and compute the homography between the projector and camera. The present invention is not concerned with, or confined by, any particular method or algorithm for identifying the homography between the projectors and the camera(s).

Projectors 12A and 12B are preferably of the liquid crystal display (LCD) type, digital light processing (DLP) type, liquid crystal on silicon (LCOS) type, or other digital projection technology type. Projectors 12A and 12B are controlled by processing unit 18 to project their respective images 14A and 14B onto screen 10. The processing unit can be a personal computer (PC), a dedicated processor, a server, or any type of computer processing device. Camera 20 is preferably a digital camera having an image sensor including a camera sensor pixel array. Although only one camera is shown in FIG. 1, a plurality of cameras may be used to obtain multiple projection views, As mentioned in the background of this invention, the overlap image 16 is formed by both projectors 12A and 12B, each contributing light to the same portion of the display surface of screen 10. The combination from two projectors in this overlap region is additive and can result in an overlap image 16 that is brighter than images 14A and 14B with noticeable color differences. The overlap image 16 can be a visible band in the overall displayed image.

As previously discussed, again in the background of the invention, in order to minimize the visual band that occurs from the overlap projections, a number of techniques have been proposed to "blend" the image to reduce the visual differences between image 14A, overlap image 16, and image 14B. As mentioned, one technique is to gradually reduce the output brightness for each projector pixel in the overlapping region in a reciprocal fashion. The brightness level of one projector gradual diminishes while the brightness of the other increases across the overlapping region. Each individual projector therefore contributes maximum brightness at its inside edge, equivalent to the non-overlapping regions nearest said edge, and contributes minimum brightness at its outside edge, furthest overlapped into the opposite projector at the boundary to the opposite projector's non-overlapped region. For example, pixels at the inside edges of the overlapping region are output at 100% brightness, while pixels at the outside edges are output at 0% brightness. This ensures that at any point between the left and right edges, exactly 100% brightness will be achieved through a combination of the brightness of projector A plus the brightness of projector B. Since each logical pixel in the overlap region has some brightness value from either projector A or B, and no logical pixel contributes more than 100% brightness, there should be no seams or gaps.

Using FIG. 1 for illustration, projector 12A is controlled by processing unit 18 to output pixels at overlap edge 22A at 100% brightness and output pixels at overlap edge 22B at 0% brightness with a linear reduction of brightness of pixels from edge 22A to edge 22B. In a reciprocal manner, projector 12B is controlled by processing unit 18 to output pixels at overlap edge 22B at 100% brightness and output pixels at overlap edge 22A at 0% brightness with a linear reduction of brightness of pixels from the edge 22B to edge 22A.

Although this is a good theoretical solution, in practice it is less than ideal. The physical qualities of the projectors, their relative locations, lighting conditions, etc., all affect the projected image. So, once the projectors are in place and ambient lighting is set, different ramping functions are tested or one ramping function is adjusted (tweaked). Projected images are viewed with each ramping function until an "optimum" result is decided upon. Since there are an infinite number of ramping functions available, this iterative visual approach is not always effective.

The present invention stores the image captured by camera 20 for a plurality of blends. These captured images are stored in Virtual Pixel Map (VPM) files that form an accurate pixel registration map of each projector. Using the VPM files, each physical device pixel on a projector can be mapped to one or more logical pixels in a virtual region defining the large format display (composite image). This virtual large format display resolution defines the unit of each VPM pixel, which is a virtual pixel in the logical display region. It also defines the relative location of VPM pixels on one device relative to VPM pixels on another. The bounded display region represents a homogenous portion of the logical display region within which every pixel is addressable by at least one physical device pixel.

Figure 2:
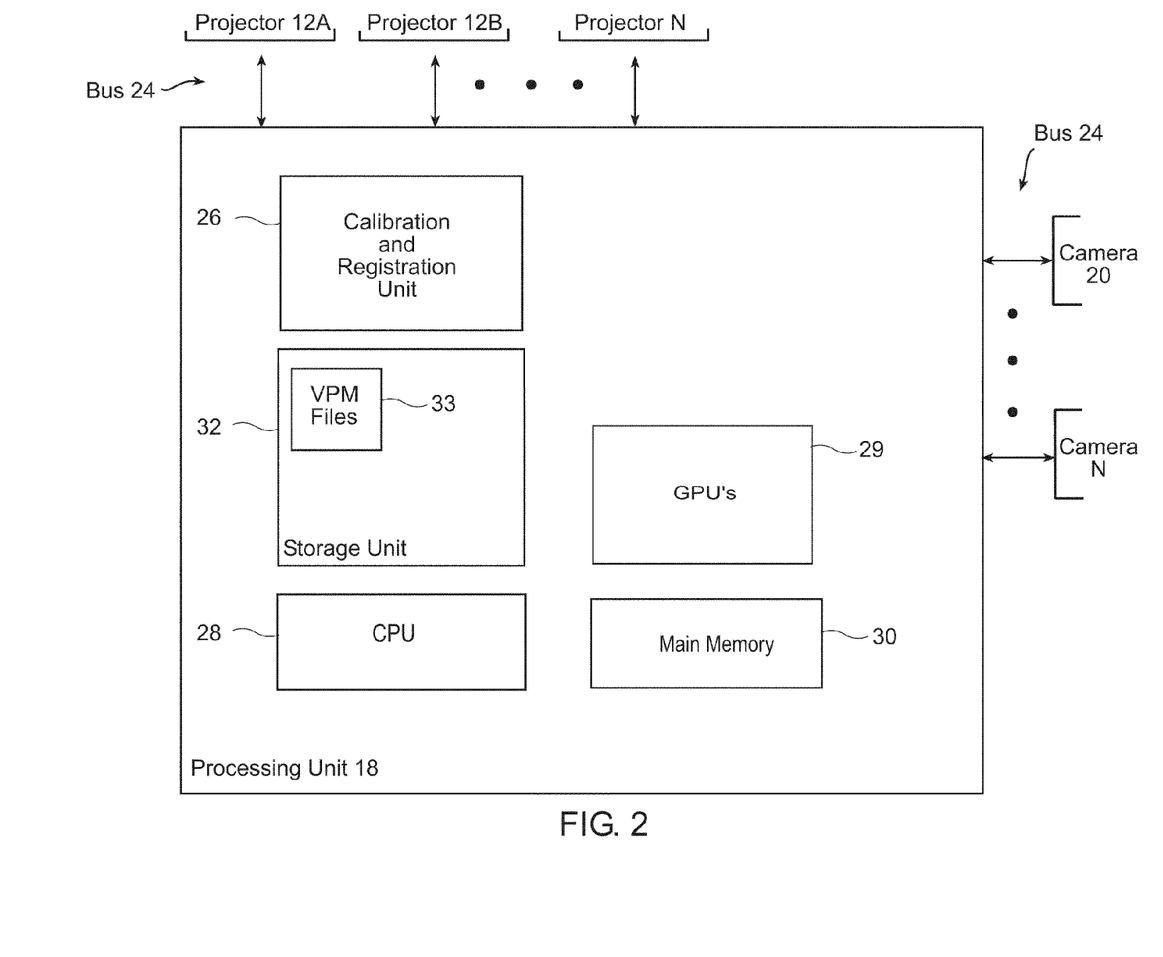
FIG. 2 is a general block diagram of the processing unit of the present invention.

FIG. 2 illustrates processing unit 18 in greater detail. Processing unit 18 interfaces with projectors 12A and 12B (shown in FIG. 1) and can further interface with a number of additional projectors up to projector N. Processing unit 18 also interfaces with camera 20 and can further interface with a number of additional cameras up to camera N. Communication between processing unit 18 and projectors/cameras is via bidirectional bus lines or via a common interface bus. These bus lines (or bus) are shown generally as bus 24 in FIG. 2.

Processing unit 18 will include various components, as is well known in the art. These will include, for example, a central processing unit (CPU) 28 and a main memory 30, which could include a hard drive, RAM, ROM, CD, etc. Main memory as used herein is all memory that can store, for example, the operating system, application programs, display software, etc. Processing unit 18 may also include one or more graphic processing units 29 (GPUs) to control the projectors. The GPUs allow for much faster processing of the displayed images, and are especially useful for displaying moving images. Processing unit 18, using CPU 28, GPUs 29, and other typical hardware/firmware and the software stored in main memory 30 will control projectors 12A and 12B to project images onto screen 10. Internal busses and connections within the processing unit are omitted for clarity; but, as is well known, one or more busses and/or signal lines connect the various internal units to each other and to external devices such as the projectors and camera.

As discussed above, in order to project what appears to be a single continuous image, each individual projector's intrinsic and extrinsic parameters must all be in a common coordinate frame. This enables multiple projectors to generate a rectangular image of known aspect ratio. Processing unit 18 includes a calibration and registration unit 26 that creates an accurate pixel registration map of each projector. Each physical device pixel on a projector can be mapped to one or more logical pixels in a virtual region defining the large format display (composite image). This virtual region will be referred to herein as a virtual pixel map (VPM). This virtual large format display resolution defines the unit of each VPM pixel, which is a virtual pixel in the logical display region. It also defines the location of VPM pixels on one device relative to VPM pixels on another. The bounded display region represents a homogenous portion of the logical display region within which every pixel is addressable by at least one physical device pixel. As mentioned above, there are numerous methods for creating a virtual pixel map such as grid or structured pattern registration but the present invention is not concerned with or confined by any particular method or algorithm for identifying the nomography between the projectors and the camera(s). The processing unit 18 will refer to the virtual pixel map, which may be contained in calibration and registration unit 26, when controlling the projectors to project an image.

The present invention is concerned with determining a best or optimum blend from among a choice of blending functions, formulas, or algorithms (referred to hereinafter generally as "blending functions"). To this end, a plurality of blending functions are stored in storage unit 32, which may be some form of memory, such as RAM. These blending functions can also be stored in main memory or some external memory such as a CD. Alternatively or additionally, one or more blending functions can be stored in storage unit 32, and CPU 28 and/or GPUs 29 can be programmed, via software in main memory 30, to alter one or more blending functions to provide a modified function. In this way, a particularly good blending function can be tweaked to determine a more favorable variation.

Each of the blending functions is used to project an image using projectors 12A and 12B. That image is captured by camera 20 and stored in a virtual pixel map (VPM) file 33 in storage unit 32. Each captured image will be composed of pixels, each pixel having a color value and a location in the virtual region defining the large format display (composite image). Each physical projector pixel is mapped to at least one logical pixel in the VPM. Thus, referring to FIG. 3, the virtual region will include a projector 12A display region 34, a projector 12B display region 36, and an overlap region 38.

Figure 3:
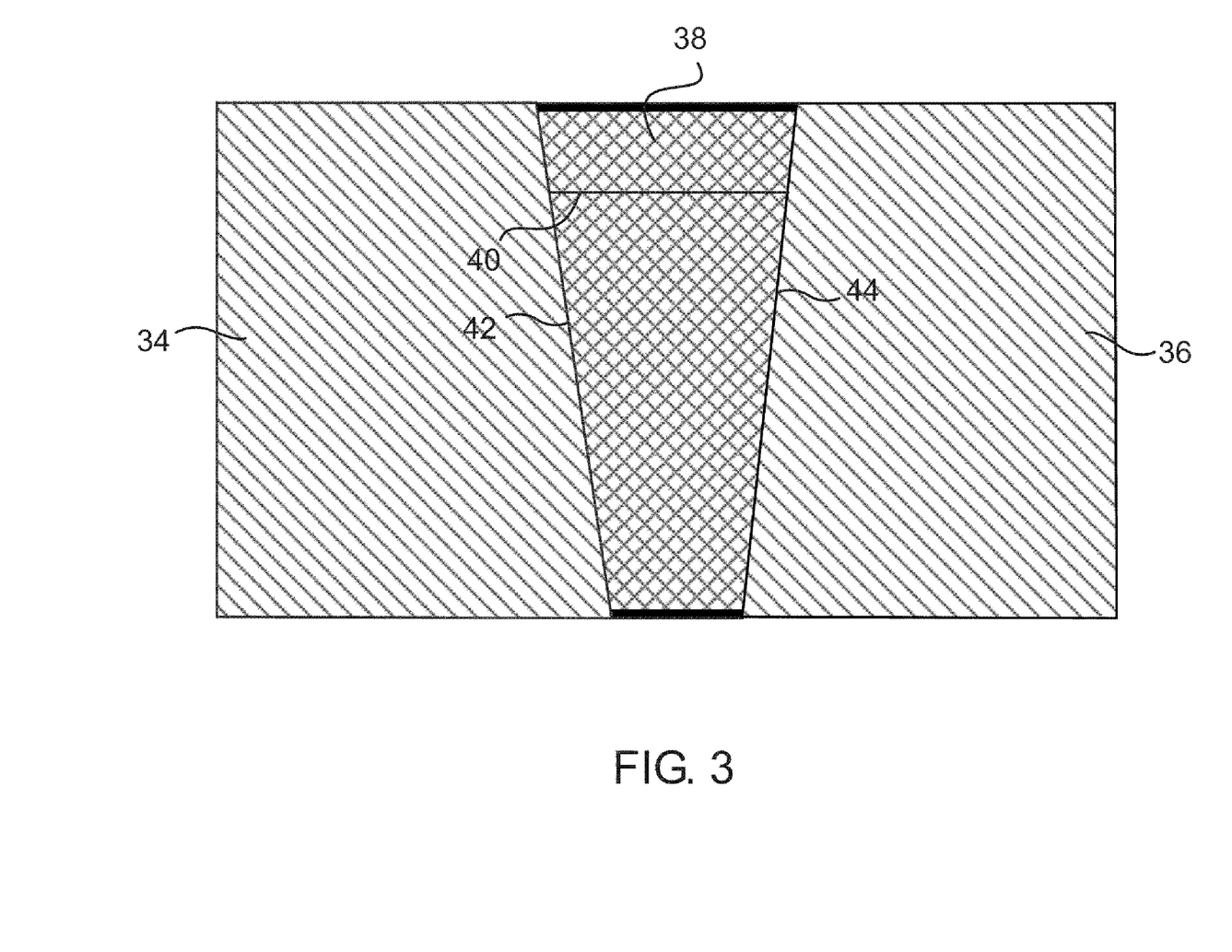
FIG. 3 illustrates the overlap region formed between two projected images.

The pixels in the overlap region 38 are examined for two qualities that can be measured independently: color value uniformity and closeness to a linear blend from one side of the overlap region to the other. This method is shown generally in the flowchart of FIG. 4. One of these values, closeness to a linear blend, is measured from the perspective of the camera (i.e., the captured image). The other value, color value uniformity, is measured from the perspective of a projector, i.e. the device output pixel values. These two qualities form a paired smoothness result for each blending function and the paired smoothness results are compared to one another to see which blending algorithm yields the best result. By examining closely related qualities from two independent perspectives we arrive at a good solution in a fairly short time.

Figure 4:
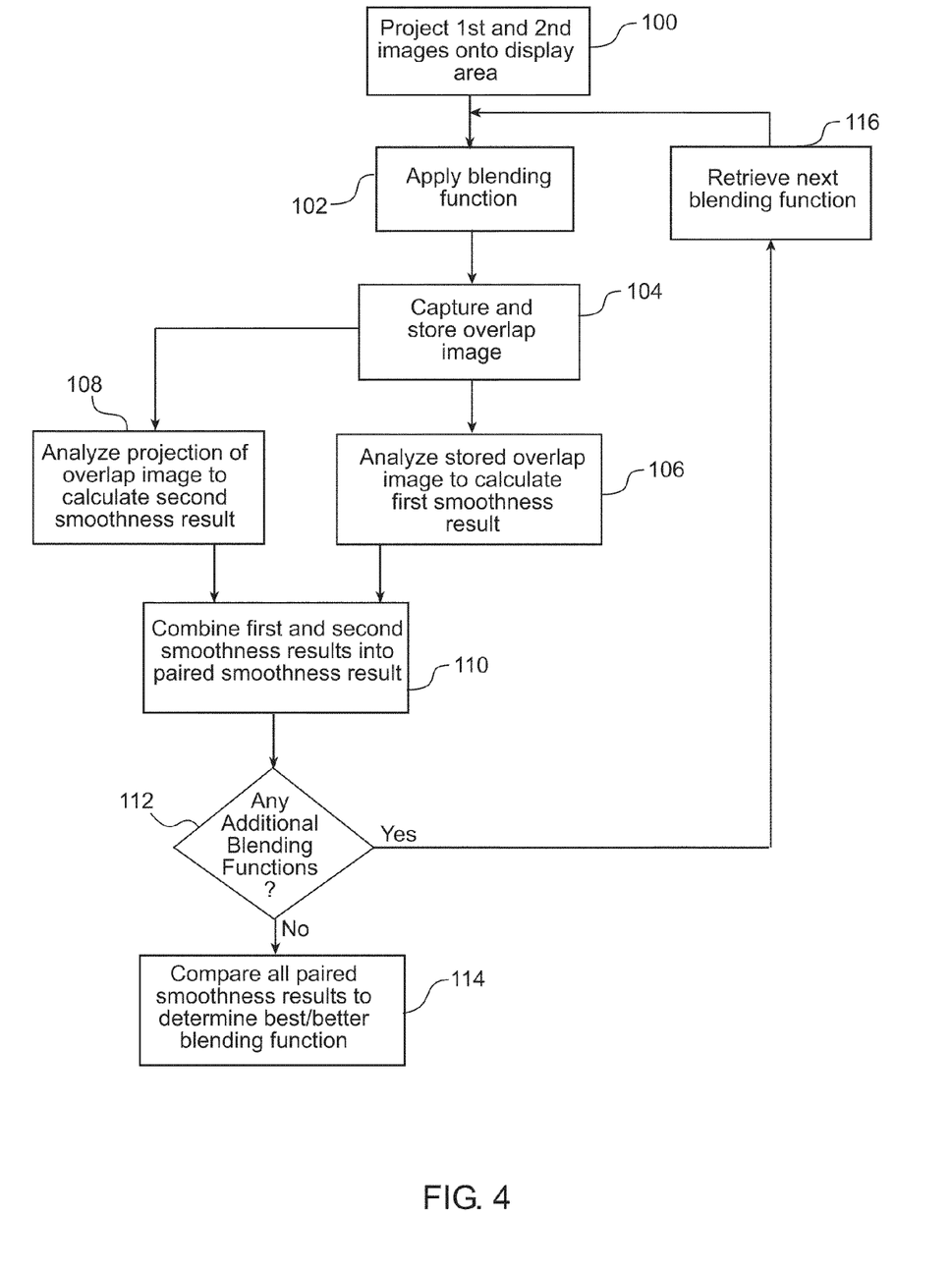
FIG. 4 is a general flow chart illustrating the method of the present invention.

Projector 12A projects a first image 14A and projector 12B projects a second image 14B (FIG. 4, step 100). Preferably, the first and second images form what appears to be a single contiguous image when projected onto screen 10. The projections overlap to create overlap image 16 (FIG. 1). During the projection of both images a blending function is applied to the projectors to alter the image that they are displaying (FIG. 4, step 102). The projected image, at least the overlap image 16, is captured by camera 20 and stored in a VPM file 33 in storage unit 32 (FIG. 4, step 104).

With regard to color value uniformity, for each line of the logical display region in the overlap area, each pixel is compared with its adjoining pixel and the difference in color value is calculated.

For this measurement, we examine the actual output pixel values of one of the projectors, e.g. projector 12A, rather than the values captured by camera 20 and stored in the VPM files. This is shown generally as step 108 in FIG. 4 but is discussed in detail as follows. We look at physical device pixels whose addresses correspond to the logical pixels that form the overlap region 38. We assume that the ramping function applied to projector 12B will be the reciprocal of the ramping function applied to projector 12A. We also assume that the two projectors are very similar in physical characteristics. As an alternative, the output pixel values of both projectors can be examined and combined in some weighted relationship that accounts for their differences in physical properties.

A "line" is shown FIG. 3 as line 40. Line 40 extends horizontally from a left side 42 of the overlap region 38 to the right side 44. Alternatively line 40 and all other lines of pixels to be examined can extend vertically across the overlap region 38 or in any direction. The "difference" in color value is referred to herein as "distance" because the two pixels will be physically separated from each other if plotted in a color space, e.g. RGB color space. The distances (color differences) between adjoining pixels are summed to arrive at a measurement sum. The difference in color value between the first pixel in a line, e.g. line 40, and the last pixel in a line is calculated to arrive at a line distance length. Then the length is subtracted from the sum to get a measurement for a line, LM. Thus LM=sum−length. A result of LM=0 is ideal.

For simplicity, let's assume we use RGB (red, green, blue) color space and we display an image using just one color channel, say red. In RGB color space, values can range from 0 to 255, assuming 8 bits are used to express a color value. The present invention is not limited to any particular color space to represent color values and any other color space such as CMYK (cyan, magenta, yellow, black), CMY, HSV (hue-saturation-value), etc. may be used. As an example, the first pixel (leftmost—side 42) of the topmost line of the overlap area may have a red value of 128 (maximum value being 255). The last pixel (rightmost—side 44) of the topmost line of the overlap area may have a red value of 100, and let's say there are 29 pixels in the topmost line of the overlap area. In an ideal blend, each pixel would differ from its adjoining pixel by 1, i.e. the second pixel has a value of 127, the third pixel has a value of 126, and so on. In this case sum would equal 28. Also, length would equal 28. So, LM=sum−length=0 in the ideal case.

Each line of the logical display region in the overlap region 38 is calculated to get a measurement LM. These measurements are then totaled to get a Total LM for a particular blending function. Multiple blending functions are used and a Total LM is calculated for each. These multiple Total LM values are then paired with the second quality that we measure, which will now be discussed.

The second quality that we look at in the present invention is linearity or closeness of the pixel values to a theoretical linear plot (line) of pixel values running from the left side 42 of the overlap region 38 to the right side 44. Each pixel in the captured image stored in a VPM file 33 in storage unit 32 is compared with its counterpart pixel in a theoretical linear plot and the difference in color value is calculated. This is shown generally as step 106 in FIG. 4 but is described in detail in the following paragraphs.

Let's again assume for simplicity, that we use RGB color space and we display an image using just one color channel, say red. Using the same example, the first pixel (leftmost—side 42) of the topmost line of the overlap region 38 may have a red value of 128 (maximum value being 255). The last pixel (rightmost—side 44) of the topmost line of the overlap region 38 may have a red value of 100, and let's say there are 29 pixels in the topmost line of the overlap area. In a perfectly linear blend, each pixel would differ from its adjoining pixel by 1, i.e. the second pixel has a value of 127, the third pixel has a value of 126, and so on. In this case sum would equal 28. This is the perfect line against which we will compare the actual pixel values for an image we are projecting for a particular blending function. So, for each pixel, we will calculate the difference d between the pixel's actual value and the ideal or linear value of the pixel in the corresponding position. For example if the actual value of the third pixel is 120, the difference d for that pixel would be 6, i.e. 126 (the ideal or linear value for the third pixel) minus 120 (the actual value). For each line, all the difference values d are added together to get a line difference Ld. To get a better value of the variance of all the pixels from the ideal line, a sum of the square of the differences is used to arrive at Ld. A value of Ld=0 is ideal. This would mean that the color changes perfectly linearly for the line from the left side 42 of the overlap region 38 to the right side 44.

Each line of the display region in the overlap is calculated to get a measurement Ld. These measurements are then totaled to get a Total Ld for a particular blending function. Multiple blending functions are used and a Total Ld is calculated for each. Each Total Ld value is paired with the corresponding Total LM values that we calculated for the same blending functions (FIG. 4, step 110). We continue the process as long as there are additional blending functions (step 112, YES) and go to step 116 to retrieve the next blending function and apply it in step 102. We move on if there are no additional blending functions (step 112, NO).

The following Table 1 shows the result for several sample blending functions A-H:

TABLE 1

| Blending function | Total LM | Total Ld |
|---|---|---|
| A | 1.23425 | 27.94473 |
| B | 1.47894 | 16.73393 |
| C | 1.41988 | 1.15038 |
| D | 1.46322 | 9.98333 |
| E | 1.50865 | 17.60075 |
| F | 1.44741 | 6.83750 |
| G | 1.52245 | 19.35853 |
| H | 1.53551 | 20.75102 |

Figure 5:
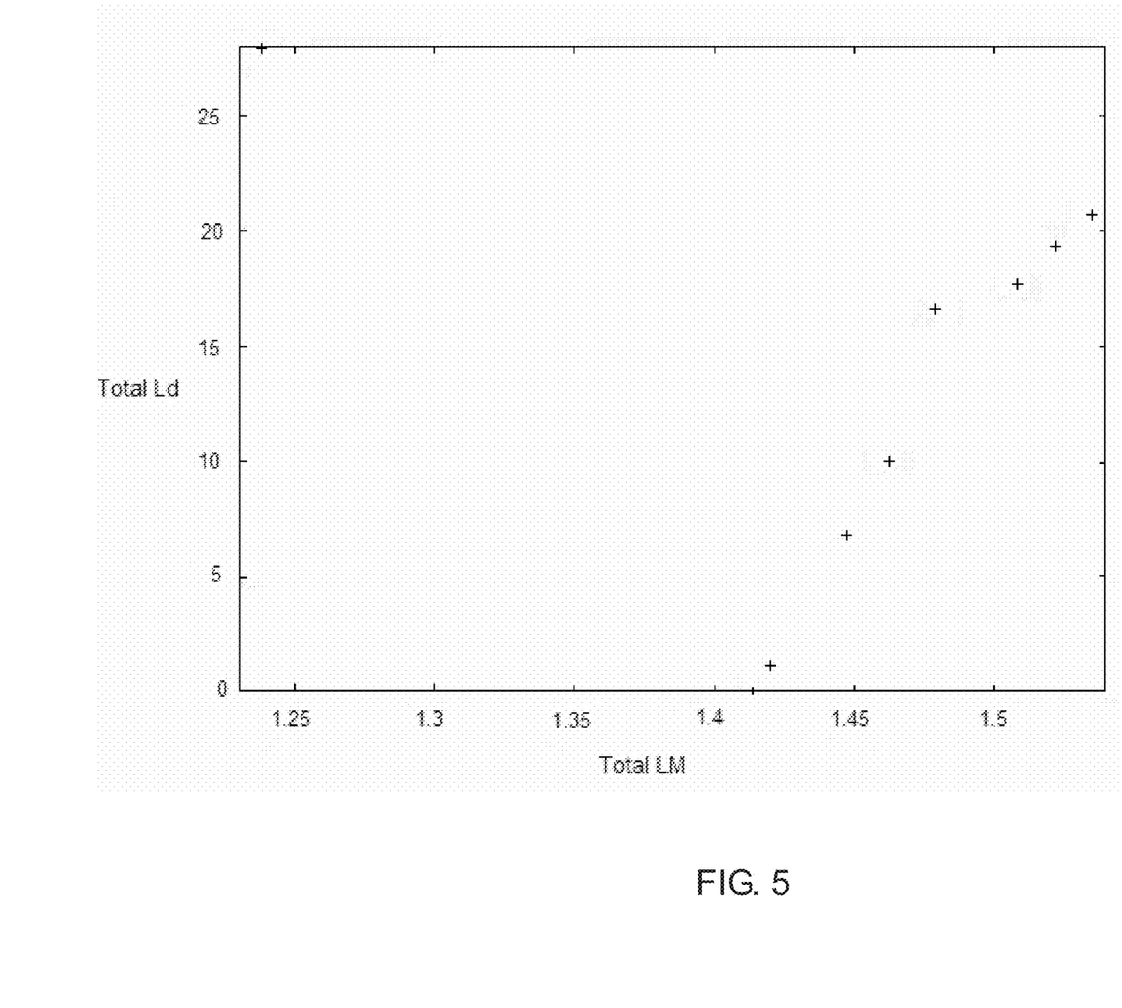
FIG. 5 is a plot of smoothness pairs corresponding to several blending functions/formulas/algorithms.

The values, i.e. the paired smoothness results, in Table 1 can be plotted as points in an X-Y Cartesian coordinate system, as shown in FIG. 5. The X axis being Total LM and the Y axis being Total Ld.

Looking at this plot of multiple Total Ld values paired with multiple Total LM values we compare these paired smoothness results and choose the value closest to the origin (0,0) because this represents the best blending function that we tested (FIG. 4, step 114). Thus, we determine the best/better blending function (from the ones that we tested) for the particular set of projectors that we are working with.

Of course we do not have to actually plot the values to determine the best blending function. Using the values alone, we can calculate the shortest vector length and choose the corresponding blending function as the best. Vector length is calculated as length $(x,y)^T = \text{sqrt}(x^2+y^2)$. In Table 1, blending function C is determined to be the best blending function of the group tested.

The calculations discussed above are performed by processing unit 18. The "best" or "better" blending function is selected as having the shortest vector length with the origin (0,0) being the start of each vector and the end point of a particular vector being the result (Total LM, Total Ld) for each respective blending function.

The present invention may be embodied on a computer-readable medium having instructions that, when executed by a computer or processing unit(s), perform the method(s) of the present invention. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention has been described in conjunction with several specific embodiments, it is evident to those skilled in the art that many further alternatives, modifications and variations will be apparent in light of the foregoing description.

Thus, the invention described herein is intended to embrace all such alternatives, modifications, applications and variations as may fall within the spirit and scope of the appended claims.

What is claimed is:

1. A method for determining a best blending function from among a plurality of blending functions, each of the plurality of blending functions for smoothing an overlap region of at least two projected images, comprising:
    (a) projecting at least a first image onto a display area;
    (b) projecting at least a second image onto the display area at the same time the first image is being projected, the second image overlapping the first image in an overlap portion of the display area to form an overlap image;
    (c) applying a first blending function while performing steps (a) and (b);
    (d) capturing at least the overlap image and storing the overlap image;
    (e) analyzing the stored overlap image for at least a first smoothness quality to calculate a first smoothness result;
    (f) analyzing the projection of the first or second image for at least a second smoothness quality to calculate a second smoothness result, wherein the second smoothness quality is different from the first smoothness quality;
    (g) combining the first and second smoothness results into a paired smoothness result;
    (h) performing steps (a) to (g) for at least one additional blending function;
    (i) comparing the paired smoothness result of the first blending function to the paired smoothness result of the at least one additional blending function to determine a best blending function.

2. The method of claim 1 where the first smoothness quality is color value linearity.

3. The method of claim 1 where the second smoothness quality is color value uniformity.

4. The method of claim 1 where the analysis performed in step (e) is performed on pixel values captured by a camera.

5. The method of claim 1 where the analysis performed in step (f) is performed on pixel values output from a projector.

6. The method of claim 1 where the comparing performed in step (g) includes comparing vector lengths of at least a first paired smoothness result to a second paired smoothness result when the first and second paired smoothness results form points in an X-Y coordinate system.

7. The method of claim 1 where the comparing performed in step (g) includes selecting the best blending function as the blending function corresponding to a paired smoothness result having the shortest vector length.

8. The method of claim 1 where the first smoothness quality is color value uniformity, and the second smoothness quality is color value linearity.

9. A non-transitory computer readable medium comprising one or more sequences of instructions which, when executed by one or more processing units, causes the one or more processing units to perform the method of claim 1.

10. A non-transitory computer readable medium comprising one or more sequences of instructions which, when executed by one or more processing units, causes the one or more processing units to perform the method of claim 6.

11. A non-transitory computer readable medium comprising one or more sequences of instructions which, when executed by one or more processing units, causes the one or more processing units to perform the method of claim 7.

12. A system for determining a best blending function from among a plurality of blending functions, each of the plurality of blending functions for smoothing an overlap region of at least two projected images, comprising:
    a first projector that projects a first image onto a display area;
    a second projector that projects a second image onto the display area at the same time the first image is being projected, the second image overlapping the first image in an overlap portion of the display area to form an overlap image;
    a processing unit that
        applies a first blending function while controlling the first projector to project the first image, and
        applies the first blending function while controlling the second projector to project the second image;
    a camera that captures at least the overlap image;
    a memory that stores the captured overlap image; wherein the processing unit
        (a) analyzes the stored overlap image for at least a first smoothness quality to calculate a first smoothness result;
        (b) analyzes the projection of the first or second image for at least a second smoothness quality to calculate a second smoothness result, wherein the second smoothness quality is different from the first smoothness quality;
        (c) combines the first and second smoothness results into a paired smoothness result;
        (d) performs steps (a) to (d) for at least one additional blending function; and
        (e) compares the paired smoothness result of the first blending function to the paired smoothness result of the at least one additional blending function to determine a best blending function.

13. The system of claim 12 where the first smoothness quality is color value linearity.

14. The system of claim 12 where the second smoothness quality is color value uniformity.

15. The system of claim 12 where the comparing performed in step (e) includes comparing vector lengths of at least a first paired smoothness result to a second paired smoothness result when the first and second paired smoothness results form points in an X-Y coordinate system.

16. The system of claim 12 where the comparing performed in step (e) includes selecting the best blending function as the blending function corresponding to a paired smoothness result having the shortest vector length.

17. A device for determining a best blending function from among a plurality of blending functions, each of the plurality of blending functions for smoothing an overlap region of at least two projected images, comprising:
    a memory that stores the plurality of blending functions;
    a storage unit that stores a plurality of overlap images, each one of the plurality of overlap images being generated during application of a corresponding one of the plurality of blending functions; and
    a processing unit that
        (a) analyzes a first stored overlap image for at least a first smoothness quality to calculate a first smoothness result, the first overlap image being generated during application of a first blending algorithm;
        (b) analyzes a first projection of an image for at least a second smoothness quality to calculate a second smoothness result, wherein the second smoothness quality is different from the first smoothness quality, and wherein the first projection occurs during application of a first blending function;

(c) combines the first and second smoothness results into a paired smoothness result;
(d) performs steps (a) to (c) for at least one additional blending function that is different from the first blending algorithm; and
(e) compares the paired smoothness result of the first blending function to the paired smoothness result of the at least one additional blending function to determine a best blending function.

18. The device of claim 17 where the first smoothness quality is color value linearity, and the second smoothness quality is color value uniformity.

19. The device of claim 17 where the comparing performed in step (e) includes comparing vector lengths of at least a first paired smoothness result to a second paired smoothness result when the first and second paired smoothness results form points in an X-Y coordinate system.

20. The device of claim 17 where the comparing performed in step (e) includes selecting the best blending function as the blending function corresponding to a paired smoothness result having the shortest vector length.

* * * * *